United States Patent
Zoppas et al.

(10) Patent No.: US 8,460,598 B2
(45) Date of Patent: Jun. 11, 2013

(54) METHOD FOR RECYCLING ENERGY IN A BLOW MOULDING MACHINE FOR BLOW MOULDING CONTAINERS

(75) Inventors: Matteo Zoppas, Conegliano (IT); Giampietro Pittari, Crocetta del Montello (IT); Mirko Altoe', Vittorio Veneto (IT); Moris Polentes, Vittorio Veneto (IT)

(73) Assignee: S.I.P.A. Societa' Industrializzazione Progettazione e Automazione S.p.A., Vittorio Veneto (IT)

( * ) Notice: Subject to any disclaimer, the term of this patent is extended or adjusted under 35 U.S.C. 154(b) by 165 days.

(21) Appl. No.: 12/667,447

(22) PCT Filed: Jul. 3, 2008

(86) PCT No.: PCT/IB2008/001752
§ 371 (c)(1),
(2), (4) Date: Dec. 31, 2009

(87) PCT Pub. No.: WO2009/004472
PCT Pub. Date: Jan. 8, 2009

(65) Prior Publication Data
US 2010/0171243 A1    Jul. 8, 2010

(51) Int. Cl.
*B29C 49/62* (2006.01)
(52) U.S. Cl.
USPC .......................................... 264/526; 264/529
(58) Field of Classification Search
None
See application file for complete search history.

(56) References Cited

U.S. PATENT DOCUMENTS 7,803,311 B2 *    9/2010    Finger et al. .................. 264/526

FOREIGN PATENT DOCUMENTS

| DE | 10 2004 014653 | 10/2005 |
| DE | 20 2005 020967 | 12/2006 |
| EP | 1 777 056 | 4/2007 |
| JP | 11 207808 | 8/1999 |
| WO | WO 2007 023349 | 3/2007 |

* cited by examiner

*Primary Examiner* — Monica Huson
(74) *Attorney, Agent, or Firm* — Sampson & Associates, P.C.

(57) ABSTRACT

A method for recycling energy and related blow molding machine—for blow molding plastic material containers including a recycling system for recycling the pneumatic energy of the discharge air coming from the blowing cavities of said machine, capable of recycling the discharge air making it available at a given pressure for a subsequent blowing in a cavity.

25 Claims, 4 Drawing Sheets

METHOD FOR RECYCLING ENERGY IN A BLOW MOULDING MACHINE FOR BLOW MOULDING CONTAINERS

FIELD OF THE INVENTION

The present invention relates to a method for recycling the pneumatic energy of discharge air, coming from the blowing cavities of moulding machines for plastic material containers, for instance bottles made of PET, and to a corresponding plant.

STATE OF THE ART

There are known plants or systems for recycling energy from air or other pressurized gases, used for various industrial processes in the related plants. An example of such systems is described in document U.S. Pat. No. 4,488,863 in which there is disclosed a system for recycling the blowing air for plastic containers comprising a plant, specifically formed by pneumatic valves and sensors, capable of tracking the compressed air pressure profile during the degassing step of the cavities and making the air available at a low pressure to be used again.

In the production of bottles or other plastic material containers, among which nowadays those made of PET are extremely widespread, the blow moulding process includes the use of considerable amounts of pressurized air inputted into the blowing cavities of single-stage machines or blowing machines.

A single-stage machine for the production of containers, such as bottles, jars etc, indicates an apparatus which, through an injection process and a subsequent stretching and blowing, in one single machine, leads to the transformation of the PET granules in the blown container. Blowing machine instead indicates an apparatus which, through a heating process and a subsequent stretching and blowing, transforms the parisons, obtained separately by means of an injection machine, into blown containers.

At the end of the blow moulding operation, the remaining pneumatic energy of the compressed air, coming from the blowing cavities, is generally lost. Systems or devices applied to this type of machines allowing to recycle and reuse this pneumatic energy, for instance for blowing the containers, are currently being developed. Given the non-negligible residual pressure of this blowing air and the continuous operation of this machinery, not recycling said pneumatic energy implies a considerable energy waste in the energy balance of these machines.

A process for recycling blowing air according the state of the art is represented by the curve 2 of the graph in FIG. 1 and takes place as follows.

Low pressure compressed air at about 10 bars, the so-called primary air, is blown in the parisons which are at a temperature such as to allow an expansion thereof to adapt to the inner profile of the blowing mould, corresponding to the A-B segment of the curve 2 in FIG. 1.

In a second step, corresponding to the segment B-H of the curve 2, compressed air at a higher pressure value, about 40 bars, is inputted into the plastic container to lead it to take a permanent shape. This air is compressed by feeding new air to the machine, introducing a great amount of energy in the system. At the end of this step, the blown plastic container is maintained at a high pressure for a time depending on the type of plastic used and on other known parameters.

At a predetermined time, the air in the container is discharged and recycled until it reaches an average pressure (about 15-18 bars), corresponding to the segment H-I of the curve 2. The air in this step is transferred into a specific tank to then be used, as mentioned above, in the subsequent blowing cycle in the A-B segment as primary blowing air (about 8-10 bars).

Subsequently, the low pressure air remaining in the container is discharged into the atmosphere corresponding to a I-J segment of the curve 2.

It is thus felt the need to make a method for recycling the pneumatic energy of the discharge air coming from the blowing cavities of moulding machines for plastic material containers, which improves the energy balance of the plastic container production plants, and to make a corresponding moulding machine with a recycling system for recycling the pneumatic energy of the discharge air.

SUMMARY OF THE INVENTION

It is a main object of the present invention to optimize the method for recycling the pneumatic energy of discharge air coming from the blowing cavities of moulding machines for plastic material containers, so as to obtain a better efficiency in virtue of a predetermined selection of shearing pressure values.

A further object of the invention is to make an alternative system for recycling the pneumatic energy of the discharge air, coming from the blowing cavities of moulding machines for plastic material containers, which allows the recycling of blowing air making it available at least one predetermined pressure either directly to the primary air tank or directly to the secondary air tank or to at least one specific recycling tank.

The present invention is thus aimed to reach the objects described above by making a method for recycling blowing air in a blow moulding machine for blow moulding plastic material containers, the machine comprising:
  moulds provided with blowing cavities,
  first blowing means for blowing primary air in the cavities of said moulds, comprising a primary air tank,
  second blowing means for blowing secondary air in the cavities of said moulds, comprising a secondary air tank,
  first recycling means for recycling the blowing air exiting from said cavities, in a first step of discharging the air from the containers,
said recycling method comprising, in accordance with claim 1, the following stages:
a) at a predetermined starting time of a blowing cycle, blowing the air into the cavities of the moulds at a first predetermined pressure, by means of the first blowing means, and maintaining the air at such a first pressure in the cavity up to a first time, in which said air is defined primary;
b) blowing the air into the cavities of the moulds at a second predetermined pressure, by means of the second blowing means, said second predetermined pressure being higher than the first pressure, and maintaining the air at said second pressure up to a second time, in which said air is defined secondary;
c) discharging the air from the cavities until a third pressure is reached in the containers, such a third pressure having a value comprised between said first pressure and second pressure, and recycling the air at said third pressure by means of the first recycling means,
d) discharging the remaining air contained in the cavities at atmospheric pressure, wherein in stage c) said third pressure has a value in the range between 20 and 28 bar.

According to a further aspect of the invention there is provided a blow moulding machine for blow moulding plastic material containers, which is adapted to implement the aforesaid method, which in accordance with claim 16 comprises moulds provided with blowing cavities; first blowing means for blowing primary air in the cavities of said moulds, comprising a primary air tank; second blowing means for blowing secondary air in the cavities of said moulds, comprising a secondary air tank; first recycling means for recycling the blowing air exiting from said cavities, in a first step of discharging the air from the containers; wherein said first recycling means are configured so as either to allow an input of primary air into a first blowing stage within the cavities of said moulds or to allow an input of a part of secondary air into a second blowing stage.

The plant, and the method associated thereto, for recycling the blowing air, may be employed in the production of plastic containers, for instance made of PET (polyethylene therephthalate) thermoplastic polymer, both in a single-stage machine and in blowing machine, including in the term blowing air both the primary air, being conventionally defined as the air at a pressure of about 8-10 bars, and secondary air, being conventionally defined as the air at a pressure of about 36-38 bars, as well as the recirculating air. The recirculating air is used especially in the production of containers made of PET, intended for filling with high temperature liquids, which, as known in the state of the art, comprises:

the usual injection process for parisons, the stretching and subsequent blowing of the parisons into the final containers, an air recirculating step within the blowing cavity, on completion of the moulding cycle, in a step during which the container made of PET is already completely formed and is still within the moulding cavity.

In a first embodiment of the process of the invention, the recycled air, either directly in the primary air tank or in a specific recycling tank, is made available at a low pressure, conventionally at approximately 8-10 bars, to be used as primary air in a subsequent blowing cycle.

Specifically, the direct recycling of the primary air in the primary air tank is compatible with the possible step of recirculating of the air inside the blowing cavity, said step being provided in the case of production of heat-set (HS) containers.

The advantages of this direct recycling include:

the high simplicity and cost-effectiveness of the plant, which does not require the use of dedicated tanks for recycling the blowing air, with corresponding systems and adjusting devices, except for those normally used for the primary and secondary air;

the use of an on/off valve arranged upstream of the pressure adjuster on the feeding line of the primary air tank to better manage the direct recycling of the air in the primary air tank;

less invasiveness during the step of recycling with respect to the total availability of the blowing time and thus a lower impact on the total process window, being the shearing pressure higher than the pressure of standard recycling methods;

the choice of the shearing pressure is calibrated so as to balance the volume of recycled air with respect to that used as primary air, and thus to reduce the pressure oscillation in the primary air tank.

In virtue of the features of this first embodiment of the process of the invention, the reduction of air consumption, and thus of energy consumption, is equal to approximately 15-20% with respect to a blowing process without recycling. In a second embodiment of the process of the invention, the recycled air is made available in two steps:

at a medium pressure, at approximately 20-25 bars, preferably between 22 and 25 bars, in order to be used as first step of the secondary air, thus employing the high pressure air coming from the compressor only upon reaching the threshold required by the process, approximately 36-38 bars, and further at a low pressure, conventionally at approximately 8-10 bars, in order to be used either as primary air or as actuating air in the machine or to be returned to the client as plant air.

Therefore, in this second case, the recycling process of the invention is named medium-low pressure recycling.

In virtue of the features of this second embodiment of the process of the invention, the reduction of air consumption, and thus of the energy consumption, is equal to about 50-55% with respect to a blowing process without recycling and about 30-35% with respect to a process with a single-step recycling.

Advantageously, according to the recycling method of the present invention, the shearing pressure values at a medium pressure are between 20 and 28 bars, preferably between 25 and 28 bars or between 22 and 25 bars.

The dependent claims describe preferred embodiments of the invention.

BRIEF DESCRIPTION OF THE DRAWINGS

Further features and advantages of the invention will become more apparent in view of the detailed description of preferred, though not exclusive, embodiments of a plant for recycling pneumatic energy of discharge air for container moulding machines shown, by way of non-limitative example, with the aid of the accompanying drawings in which.

DETAILED DESCRIPTION OF PREFERRED EMBODIMENTS OF THE INVENTION

Figure 1:
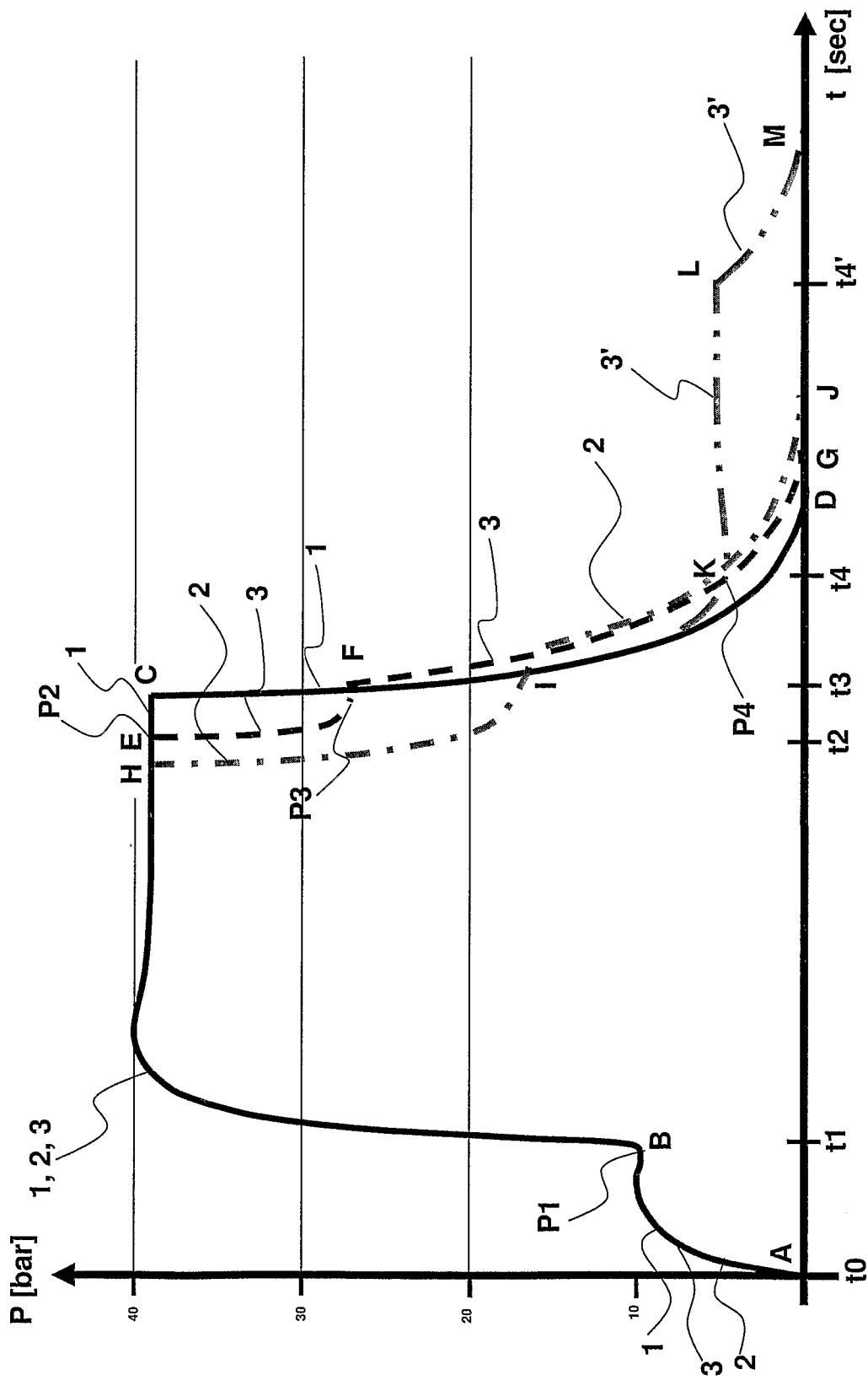
FIG. 1 shows the graphs of the pressure profiles in blowing cavities, which are respectively related to a standard blowing process without air recycling, to a process with air recycling according the known art and to a first embodiment of a process with air recycling according to the present invention.

Referring to FIG. 1, the pressure profiles in blowing cavities for plastic containers are diagrammatically shown in a comparative manner, the profiles corresponding to:

i) a standard blowing process with use of primary air plus secondary air, without air recycling: profile A-B-C-D, indicated by the curve having reference number 1;

ii) a blowing process with recycling of the blowing air according to the state of the art: profile A-B-H-I-J, indicated by the curve having reference number 2;

iii) a first embodiment of the blowing process with air recycling at a medium pressure according to the invention: profile A-B-E-F-G indicated by the curve having reference number 3.

The recycling process of the invention for recycling the blowing air at a medium pressure is carried out as follows.

Compressed air at low pressure P1, about 10 bars, the so-called primary air, is blown into the parisons which are at a temperature such as to allow an expansion thereof to adapt to the inner profile of the blowing mould, corresponding to the segment of curve A-B in FIG. 1.

In a second step, corresponding to the segment B-E of the curve 3, secondary air at a high pressure P2, at about 40 bars, is inputted into the plastic container to make it take a permanent shape. This air is produced by compression means of known type and consists of new air for the system.

In the final part of this second step, the blown plastic container is maintained at a high pressure for a time depending on the type of plastic used and on other known parameters.

At a predetermined time, in a third step, the air in the container is discharged and recycled up to reach a medium pressure P3, of approximately 20-28 bars, preferably 25-28 bars, corresponding to the segment E-F of the curve 3.

In a first variant of the process, the air recycled in this third step is directly transferred to the primary air tank to be later used in the subsequent blowing cycle in the A-B segment.

In a second variant of the process, the air recycled in this third step is transferred to a recycling tank, different from the primary air tank, to be later used in the subsequent blowing cycle in the segment A-B, as mentioned above.

The duration of this third-step is in the range between 0.05 and 0.15 seconds. A fourth step is then implemented, in which the remaining air in the blown container is discharged into the atmosphere (segment F-G of the curve 3).

It is worth noting that the choice of the shearing pressure value (point F) is calibrated so as to balance the recycling volume at net efficiency with respect to that needed for feeding primary air.

Advantageously, during the aforesaid fourth discharge step, the air may be maintained at a pressure P4, preferably equal to about 4-6 bars, for carrying out a step of recirculating in cavities corresponding to the segment K-L of the curve 3'. Said recirculating step is carried out in order to maintain a counterpressure in the containers, contained in the cavities, of preferably about 5 bars.

A pre-pressurization stage of the primary air tank or of the recycling tank is advantageously provided in order to guarantee the pressure P1 in the containers during the step of starting the moulding machine up.

Figure 2:
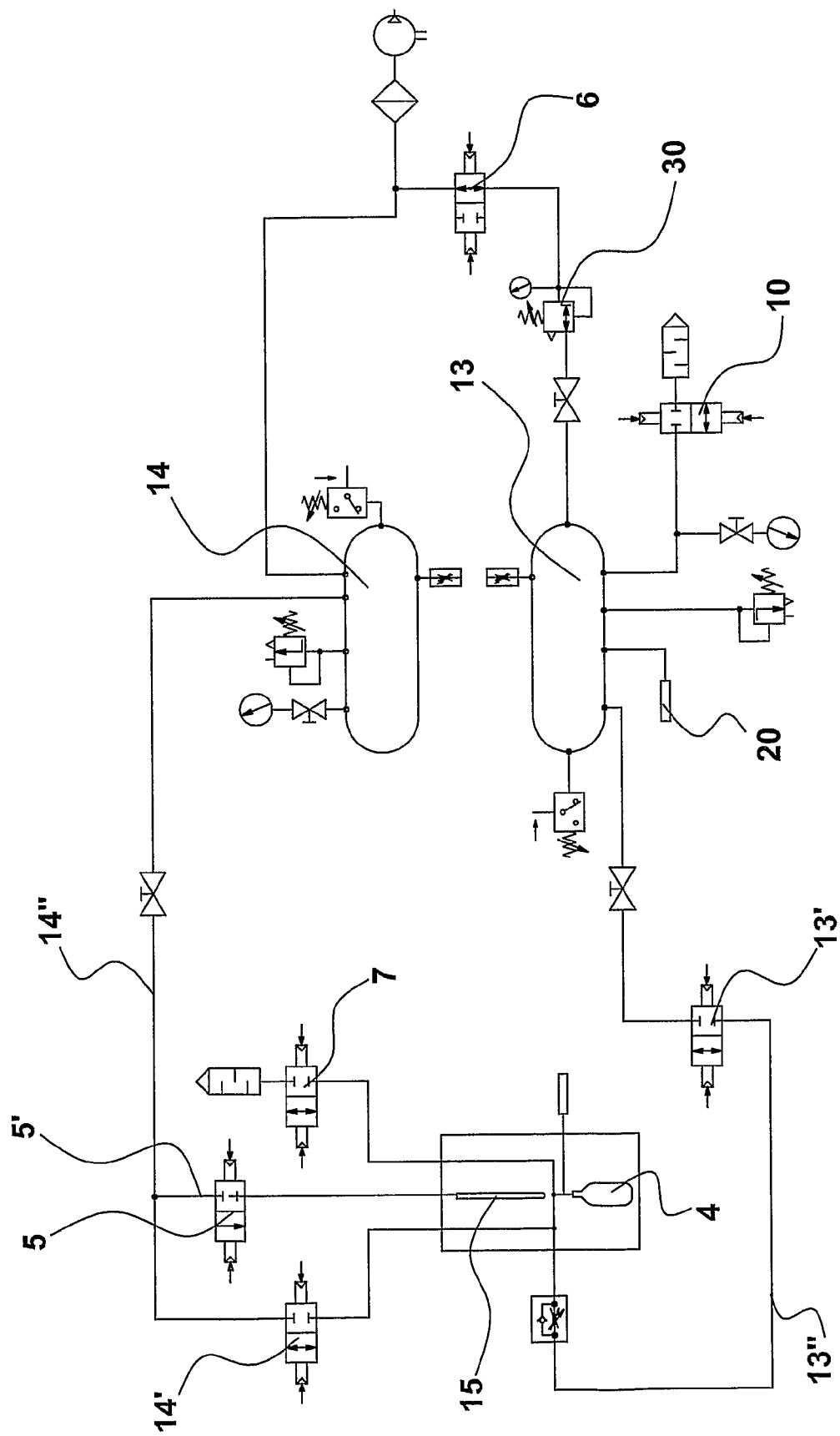
FIG. 2 shows a first variant of a diagram of a plant adapted to implement the air recycling process of the invention shown in FIG. 1.

FIG. 2 shows a first variant of a pneumatic diagram of the blowing plants, using primary and secondary air, recirculating air and air recycled from the blowing process as described above, in case of a direct recycling of the air in the primary air tank.

Such a plant advantageously comprises:
blowing means, comprising in turn the blowing of primary air and secondary air;
possible recirculating means;
possible thermoregulation means of the blowing moulds;
a recycling system for recycling the blowing and/or recirculating air.

The blowing means comprise the primary and secondary air tanks 13, 14, the corresponding input valves 13', 14' for the input in the containers, the corresponding piping 13", 14", the corresponding compressors.

The recirculating means comprise the recirculating valve 5, the corresponding piping 5' and the same stretching rod 15, provided with a channel internal thereto to introduce the recirculating air into the containers 4.

The thermoregulation means for the moulds comprise, for instance, oil control units or resistors with an installed power of about 1.8 kW per cavity.

The recycling system for recycling the pneumatic energy of the blowing air and of the possible recirculating air, coming from the blowing cavities of single-stage machines or blowing machines comprises in turn:
air recycling means;
and electronic control and automation means.

Advantageously, in this first variant, the recycling means for recycling the blowing and recirculating air comprise the same primary air circuit with the aforesaid primary air tank 13, so that the recycled air is transferred directly thereto.

The input valve 13', which supplies the primary air into the blowing cavity, is a two-way valve which, at the beginning of the cavity degassing, directs the air flow back towards the primary air tank 13 restoring, basically in excess, the pressure ps0 present therein at the start of blowing, i.e. the pressure P1 of the first blowing step, starting from that pressure ps1 at the end of the primary air input.

When this first pressure ps2 is reached in the tank 13, basically in excess as compared to the pressure ps0, the valve 13' closes and simultaneously the degassing valve 7 opens to complete the emptying of the cavity.

The final pressurization of the tank 13 at the precise pressure ps0 of the start of primary air blowing, which precision is required for forming the blown container, is obtained:
by reducing the pressure ps2 in excess to a pressure basically lacking ps3, by means of a discharge valve 10 controlled by a signal coming from a pressure transducer 20,
and finally by possibly correcting the initial value ps0 by means of a pressure adjuster 30, placed at the inlet of the in-line feeding of the tank 13.

The simultaneous use of different instruments for correcting the pressure in the primary air tank 13 is needed to however assure to repeatably reach the primary air pressure ps0 of blowing start from the pressure of primary air blowing end ps1, regardless of the process needs of the container to be blown and to maximize blowing air recycling and, thus, the reduction in consumption.

Advantageously, at the primary air blowing start, the in-line feeding of the tank 13 by means of the pressure adjuster 30 is interrupted by operating an on/off valve 6 in order to avoid the in-line feeding itself from restoring the pressure ps0, thus allowing this to be performed, in the aforesaid manner, by the discharge air coming from the blowing cavity through said two-way valve 13'.

Furthermore, being the shearing pressure (point F of the curve 3, FIG. 1) higher than the shearing pressure of a standard recycling step (point I of the curve 2, FIG. 1), the invasiveness of the step of recycling is reduced with respect to the total availability of the blowing time, and so also the impact on the total process window.

In a second variant (not shown) of the pneumatic diagram, the blowing and recirculating air recycling means comprise a specific recycling tank, corresponding piping and recycling valve. In this case, the primary air input valve 13' into the containers may be a simple one-way valve.

Advantageously, there is provided, downstream of said recycling tank, a pipe with a further valve for inputting the primary air into the containers 4. This further primary air input valve is opened for using the recycled air in the so-called primary air step corresponding to the segment A-B of the curve 3.

There are specifically provided pneumatic valves and sensors, capable of tracking the pressure profile of the pressurized air during the degassing step of the blowing cavities.

The aforesaid recycling means in both variants, advantageously, make the recycled air available at the predetermined pressure P1 (approximately 8-10 bars). During the final step of discharging from the containers 4 (segment F-G) an adjustment of the pressurized air may be provided by means of appropriate adjusting means at an essentially constant pressure P4, preferably equal to approximately 4-6 bars, in order to produce an optimal counter pressure in the cavity, suitable for the production of containers with hot filling strength features.

The electronic control and automation means, in both variants, comprise:
  elements of connection to the electric mains;
  electromechanical control and protecting means for the apparatuses of the plant, such as switches, isolators, fuses, etc.;
  electronic control card and corresponding software.

FIGS. 1 and 2 show the activation sequence of the main valves of the plant of the invention, in its first variant, working at full rating:
  opening the two-way valve 13' in the first direction for inputting primary air (segment A-B) at the pressure P1 up to the time t1 necessary for stabilizing the pressure in the container;
  opening the input valve 14' for imputing the secondary air at the pressure P2 (segment B-E) up to time t2 necessary for stabilizing the pressure in the container;
  reopening the two-way valve 13' in the second direction, opposite to the first, for a direct recycling of the blowing air, exiting from the container 4, in the primary air tank 13 (segment E-F) up to a time t3;
  closing the two-way valve 13' and simultaneously opening the decompression or degassing valve 7 until the air is completely discharged into the atmosphere (segment F-G).

In the case of the second variant of the pneumatic diagram (not shown), the activation sequence of the main valves of the plant, when working at full rating, is the following:
  opening the input valve 13' for inputting the primary air (segment A-B) at pressure P1 up to time t1 necessary for stabilizing the pressure in the container;
  opening the input valve 14' for inputting the secondary air at the pressure P2 (segment B-E) up to time-t2 necessary for stabilizing the pressure in the container;
  opening the recycling valve for the input of blowing air, already employed in the container, in the recycling tank (segment E-F) up to a time t3;
  closing the recycling valve and simultaneously opening the decompression valve until the air is completely discharged from the cavity into the atmosphere (segment F-G).

Alternatively, in both variants, in case of production of heat-set plastic containers, along the segment F-G there are provided, when the pressure P4 is reached in the blowing cavity at a time t4 (point K):
  opening the recirculating valve 5 for the input of recirculating air into the container 4, the degassing valve 7 remaining open at the same time,
  and maintaining the counter pressure in the container at the value P4 up to a time t4' (segment K-L).

In this case, the full discharging of the residual air from the cavity into the atmosphere (segment L-M) is performed by closing the recirculating valve 5 and leaving the decompression valve 7 always open.

The times t1, t2, t3, t4 and t4' are determining times for the cycle and depend on various factors.

In the case of t1 and t2, they are defined, with respect to the time t0 of the start of blow moulding cycle, on the basis of detections of the pressure existing within the containers which must preferably reach a predefined stable level.

The time t3 is also defined on the basis of the thickness of the wall of the containers which must be subjected to the conditioning process which takes place in contact with the hot walls of the mould.

The range between t2 and t3 takes values in the range between 0.05 and 0.15 sec.

The possible range between t4 and t4' takes values in the range between 0.3 and 1 sec.

Figure 3:
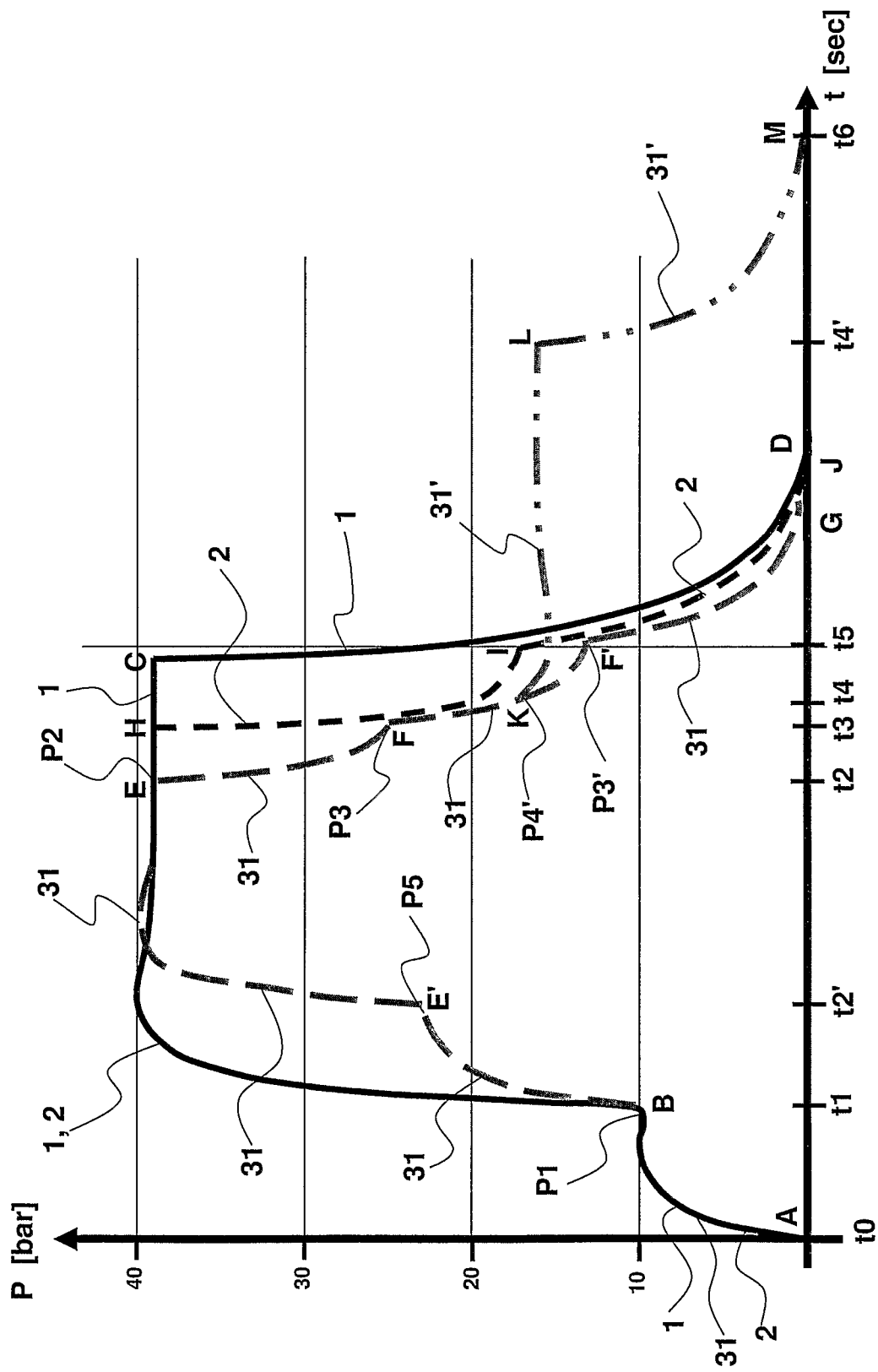
FIG. 3 shows the graphs of the pressure profiles in blowing cavities, which are respectively related to a standard blowing process without air recycling, to a process with air recycling according the known art and to a second embodiment of a process with air recycling according to the present invention.

With reference to FIG. 3, the pressure profiles in blowing cavities for plastic containers are diagrammatically shown in a comparative manner, the profiles corresponding to:
  i) the standard blowing process using primary air plus secondary air, without air recycling: profile A-B-C-D, indicated by the curve having reference number 1;
  ii) the blowing process with recycling of blowing air of the state of the art: profile A-B-H-I-J, indicated by the curve having reference number 2;
  iii) a second embodiment of the blowing process with air recycling at a medium pressure according to the invention: profile A-B-E'-E-F-F'-G, indicated by the curve having reference number 31.

The blowing air recycling process, in this second embodiment, provides a double-recycling at medium and low pressure and is performed as follows.

Compressed air at low pressure of about 10 bars, the so-called primary air, is blown in the parisons, which are at a temperature such as to allow an expansion thereof to adapt to the inner profile of the blowing mould, corresponding to the segment of curve A-B in FIG. 1.

In a second step, corresponding to the segment B-E' of the curve 31, compressed air is introduced at a pressure P5 of higher value, approximately 20-23 bars. This is the so-called secondary air at medium pressure which is taken from an air tank containing recycled air in a part of the emptying step of the containers at the end of the moulding process.

In a third step, represented by the segment E'-E of the curve 31, secondary air at a high pressure P2, at about 40 bars, is then inputted into in the plastic container to make it take a permanent shape. This air is produced by compression means of the known type and consists of new air for the system. In the final part of this third step the blown plastic container is maintained at a high pressure for a time depending on the type of plastic used and on other known parameters.

At a predetermined time, in a fourth step, the air in the container is discharged and recycled until an intermediate pressure P3 is reached (about 22-25 bars), corresponding to the E-F segment of the curve 31. The air in this fourth step is transferred either to a first dedicated recycling tank or directly into the secondary air tank to be later used, as already mentioned above, in the subsequent blowing cycle in the B-E' segment. The duration of this fourth step is in the range between 0.05 and 0.10 seconds.

Subsequently, a second discharge step of the air from the container in which the air is recycled at a low pressure P3' (about 12-14 bars), corresponding to the F-F' segment of the curve 31, and transferred in a second recycling tank or other suitable dedicated storing means. The duration of this further discharge step is in the range between 0.05 and 0.10 seconds.

This air is used in the following blowing cycle, in the segment A-B as primary air (about 8-10 bars). A further use for this recycled air at low pressure is that for the pneumatic actuation of the blowing machine, during its operation, or, if the production of low pressure air is in excess with respect to the cited previous uses, it may be used, for instance, as plant air.

Advantageously, during the above said second discharge step, the air may be maintained at a pressure P4', preferably equal to approximately 12-18 bars, for carrying out a recycling step in the cavities corresponding to the segment K-L of the curve 31'. Said recycling step is carried out in order to maintain a counter pressure in the containers, contained in the cavities, which is in the range between 13 and 17 bars, preferably about 15 bars. Such values may however vary as a function of the thickness of the wall of the containers to be conditioned, between a minimum of 10 bars and a maximum of 30 bars.

There is advantageously provided a pre-pressurization stage of the first and second recycling tanks or of the secondary air tank and of the second recycling tank in order to respectively ensure in the containers the pressure P5 and the pressure P1 during the start-up step of the moulding machine.

The remaining air in the blown container is discharged in the atmosphere starting from a pressure lower (segment F'-G of the curve 31) than the pressure at which it is discharged in the atmosphere in the plants of the state of the art, (segment I-J of the curve 2). This allows a further saving as the air that is discharged in the atmosphere has a lower energy content.

It should be noted that the choice of the shearing pressure-values (points F, F') is set in order to balance the recycling volumes at net efficiency with those required for the feeding of the primary air and of the first step of the secondary air (points B, E').

Figure 4:
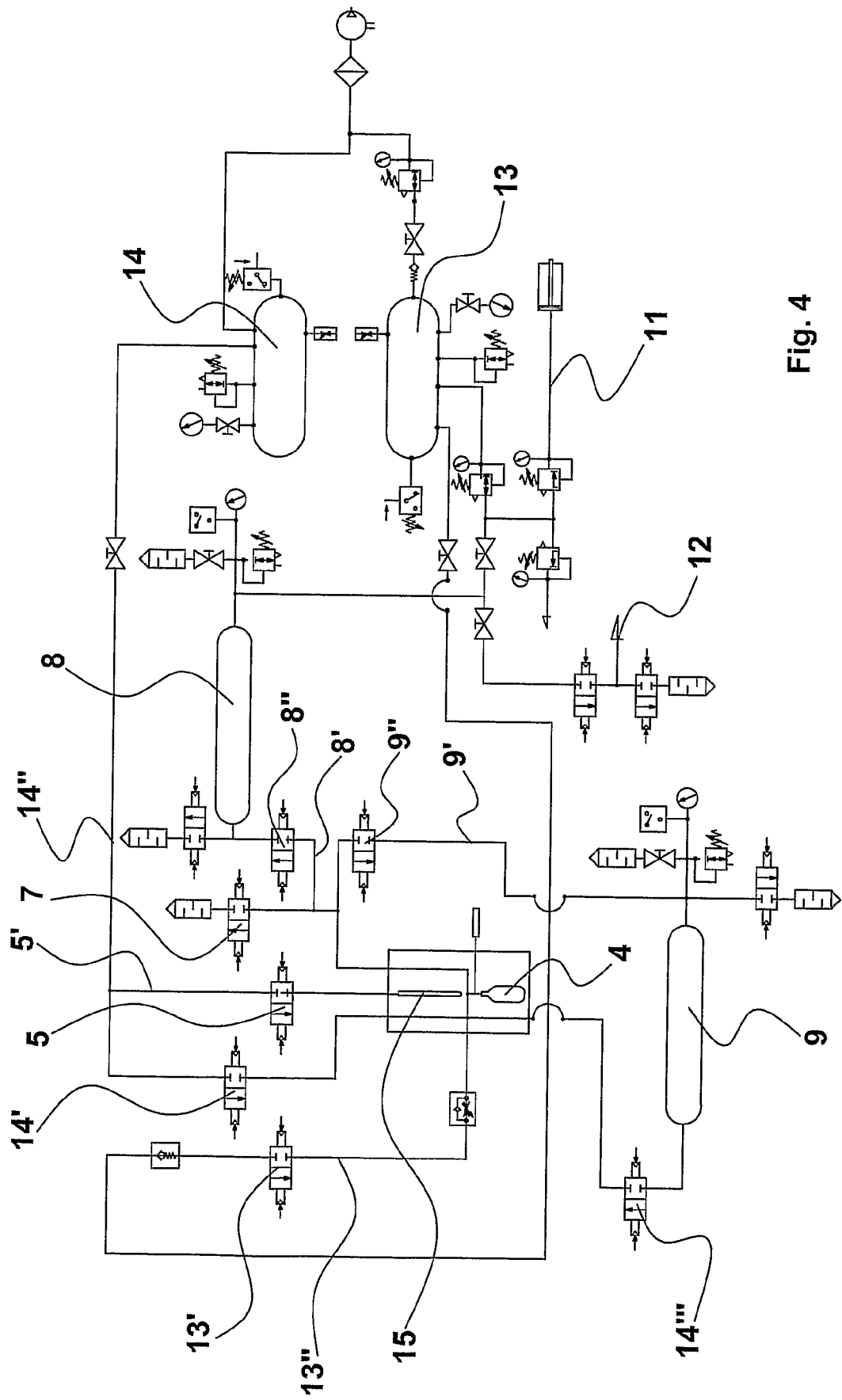
FIG. 4 shows a diagram of a plant adapted to implement the air recycling process of the invention shown in FIG. 3.

FIG. 4 shows a third variant of a pneumatic diagram of the blowing plants, using primary and secondary air, recirculating air and recycled air from the blowing process as described in this second embodiment, in the case in which two dedicated recycling tanks are provided.

In this diagram, the recycling tanks of air at medium and low pressure are indicated by corresponding numerals 8 and 9.

Such a plant, as the one shown in FIG. 2, advantageously comprises:
  the blowing means, comprising in turn the blowing of primary air and secondary air;
  possible recirculating means, appropriately adapted for increased flow rates with respect to the known plants;
  possible thermoregulation means for the blowing moulds having an increased power, about twice as much with respect to the known plants;
  a recycling system for the blowing and/or recirculating air.

The blowing means comprise the primary and secondary air tanks 13, 14, the corresponding input valves 13', 14' for the input in the containers, the corresponding pipings 13", 14", the corresponding compressors.

The recirculating means comprise the recirculating valve 5, the corresponding piping 5' and the same stretching rod 15, provided with a channel internal thereto to introduce the recirculating air in the containers 4.

The thermoregulation means for the moulds comprise, for instance, oil control units or resistors with an installed power of about 1.8 kW per cavity.

Finally, the recycling system for recycling the pneumatic energy of the blowing air and of the possible recirculation, coming from the blowing cavities of single-stage machines or blowing machines, comprises in turn:
  air recycling means;
  and electronic control and automation means.

The recycling means for the blowing and recirculating air advantageously comprise:
  a first recycling tank 9, the corresponding piping 9' and recycling valve 9''';
  a second recycling tank 8, the corresponding piping 8' and recycling valve 8''.

Advantageously, downstream of said first tank 9 there is provided a piping with a further input valve 14''' for the input of secondary air to the containers 4. This valve 14''' is opened to carry out the so-called first step of the secondary air corresponding to the segment B-E' of the curve 31.

There are specifically provided pneumatic valves and sensors, capable of tracking the pressure profile of the pressurised air during the degassing step of the blowing cavities.

Said recycling means advantageously make the recycled air available:
  at a predetermined pressure P3 (about 22-25 bars);
  and at a further predetermined pressure P3' (about 12-14 bars), in order to be possibly adjusted by appropriate adjustment means at a substantially constant pressure P4', preferably equal to about 12-18 bars, to produce an optimal counter pressure in the cavities, suitable for the production of containers with hot filling and long life strength features.

Alternatively, in a variant (not shown) of the pneumatic diagram in FIG. 4, the first step of recycling the blowing air occurs directly into the secondary air tank. As similarly described for the direct recycling step into the primary air tank, in this case, the input valve 14', which supplies the secondary air into the blowing cavity, is a two-way valve which, at the start of degassing of the cavity, directs the air flow back towards the secondary air tank 14 restoring, basically in excess, the pressure ps0' present therein at the blowing start, i.e. the pressure P5 of first blowing step of the secondary air, starting from that pressure ps1' at the end of the secondary air input.

When this first pressure ps2' is reached in the tank 14, basically in excess with respect to the pressure ps0', the valve 14' closes and simultaneously the recycling valve 8'' of the recycling tank 8 is opened.

The final pressurisation of the tank 14 at the precise pressure ps0' of secondary air blowing start is thus obtained:
  by reducing the pressure ps2' in excess to a pressure basically lacking ps3', by means of a discharge valve controlled by a signal coming from a pressure transducer,
  and finally by possibly correcting the initial value ps0' by means of a pressure adjuster, placed at the inlet of the in-line feeding of the secondary air tank.

The simultaneous use of different instruments for correcting the pressure in the secondary air tank 14 is needed to however ensure to repeatably reach the secondary air pressure ps0' of blowing start from the pressure ps1' of secondary air blowing end, regardless of the process needs of the container to be blown and to maximize blowing air recycling and, thus, to reduce consumption.

Advantageously, at the secondary air blowing start, the in-line feeding of the tank 14 by means of the pressure adjuster 30 is interrupted by operating an on/off valve in order to prevent the same in-line feeding from restoring the pressure ps0', thus allowing that this is performed, in the aforesaid manner, by the discharge air coming from the blowing cavity through the two-way valve 14'.

The electronic control and automation means, also in these other two variants, comprise:
  elements of connection to the electric mains;
  electromechanical control and protection means for the apparatuses of the plant, such as switches, isolators, fuses, etc.;
  electronic control card and corresponding software.

The FIGS. 3 and 4 show the activation sequence of the main valves of the plant of the invention when it works at full rating:

opening the input valve 13' for the primary air (segment A-B) at the pressure P1 up to time t1 necessary for stabilizing the pressure in the container;

opening the input valve 14''' for inputting the secondary air at the pressure P5 (segment B-E') up to time t2' necessary for stabilizing the pressure in the container;

opening the input valve 14' for inputting the secondary air at the pressure P2 (segment E'-E) up to time t2 necessary for stabilizing the pressure in the container;

opening the recycling valve 9" for the input of blowing air, already employed in the container, in the first recycling tank 9 (segment E-F) up to a time t3;

opening the recycling valve 8" for the input of blowing air, already employed in the container, in the second recycling tank 8 (segment F-F') up to a time t5;

closing the recycling valve 8" and simultaneously opening the decompression valve 7 until the air is completely discharged from the cavity into the atmosphere (segment F'-G).

In the case of the further variant of the pneumatic diagram (not shown), in which there is provided the first direct recycling in the secondary air tank, the activation sequence of the main valves of the plant, when working at full rating, is the following:

opening the input valve 13' for inputting the primary air (segment A-B) at the pressure P1 up to time t1 necessary for stabilizing the pressure in the container;

opening the two-way valve 14' in the first direction for introducing secondary air (segment B-E') at the pressure P5 up to the time t2', and then at the pressure P2 (segment E'-E) up to the time t2, necessary for stabilizing the pressure in the container;

reopening the two-way valve 14' in the second direction, opposite to the first, for directly recycling the blowing air, exiting from the container 4, into the secondary air tank 14 (segment E-F) up to a time t3;

closing the two-way valve 14' and simultaneously opening the recycling valve 8" for inputting the blowing air, already employed in the container, into the second recycling tank 8 (segment F-F') up to a time t5;

closing the recycling valve 8" and simultaneously opening the decompression valve 7 until the air is completely discharged from the cavity into the atmosphere (segment F'-G).

Alternatively, in the case of production of heat-set long-aging plastic containers, along segment F-F' there are provided, when the pressure P4' is achieved in the blowing cavity at a time t4 (point K):

opening the recirculating valve 5 for inputting recirculating air in the container 4, the recycling valve 8" remaining open at the same time, and maintaining the counter pressure in the container at the value P4' up to a time t4' (segment K-L).

In this case the complete discharge of the residual air of the cavity in the atmosphere (segment L-M) is carried out by closing-the-recycling valve 8" and the recirculating valve 5 and simultaneously opening the decompression valve 7.

The times t1, t2', t2, t3 and t5 or t4 and t4' are determining times for the cycle and depend on various factors.

In the case of t1 and t2, they are defined, with respect to the cycle starting time t0, on the basis of detections of the pressure existing within the containers which must preferably reach a predefined stable level.

The times t3 and t5 are also defined on the basis of the thickness of the wall of the containers which must be subjected to the conditioning process which takes place in contact with the hot walls of the mould.

The range between t2 and t3 and that between t3 and t5 take values in the range between 0.05 and 0.10 sec.

The possible range between t4 and t4' takes values in the range between 0.2 and 1.5 sec.

As the pressure P4' may coincide with the pressure P3', the times t4 and t5 may in turn coincide.

At the end of each blow moulding operation, the air stored in the recycling tank 8 may advantageously be reused to feed the tank of primary air 13, or it may be directed to a first handling air delivery 11 or to a second air delivery 12 for the reuse in different parts of the plant.

Advantageously, the air stored in the recycling tank 9 is reused to feed the containers 4 in the first step of the secondary air (segment B-E').

In all the variants described above, the plant adjustments to the machines for the production of containers made of PET, in order to allow the recycling of the blowing air according to the modes described here, may be applied both to single-stage machines and to blowing machines.

The invention claimed is:

1. A method for recycling blowing air from a blow moulding apparatus for blow moulding plastic material containers, said apparatus including:

moulds provided with blowing cavities, first blowing means for blowing primary air in the cavities of said moulds, comprising a primary air tank, second blowing means for blowing secondary air in the cavities of said moulds, comprising a secondary air tank, first recycling means for recycling the blowing air exiting from said cavities, in a first step of discharging the air from the containers, wherein said first recycling means are configured so as either to allow an input of primary air into a first blowing stage within the cavities of said moulds or to allow an input of a part of secondary air into a second blowing stage, said method comprising the following stages:

a) at a predetermined starting time t0 of a blowing cycle, blowing the air into the containers contained in the cavities of the moulds at a first predetermined pressure P1, by means of the first blowing means, and maintaining the air at such a first pressure in the containers contained in the cavities up to a first time t1, in which said air is defined primary;

b) blowing the air into the containers contained in the cavities of the moulds at a second predetermined pressure P2, by means of the second blowing means, said second predetermined pressure being higher than the first pressure P1, and maintaining the air at said second pressure up to a second time t2, in which said air is defined secondary;

c) discharging the air from the containers contained in the cavities until a third pressure P3 is reached in the containers, such a third pressure having a value comprised between said first pressure P1 and second P2 pressure, and recycling the air at said third pressure P3 by means of the first recycling means, wherein said third pressure P3 has a value in the range between 20 and 28 bar, this stage having a duration in the range between 0.05 and 0.15 sec, c') discharging and recycling the air from the containers contained in the cavities until a fourth pressure P3' is reached in the containers with a value between 12 and 14 bars, and transferring the recycled air in a recycling tank or other dedicated storing means, this stage having a duration in the range between 0.05 and 0.10 seconds; and d) discharging the remaining air contained in the containers contained in the cavities at atmospheric pressure.

2. A method according to claim 1, wherein the air recycled by the first recycling means is directly recycled in the primary air tank to provide primary air in a stage a) of a subsequent blowing cycle.

3. A method according to claim 2, wherein in stage c) the direct recycling in the tank allows to reach therein a pressure (ps2) basically in excess with respect to the first pressure (P1) present therein at the starting time (t0) of a blowing cycle.

4. A method according to claim 3, wherein there is provided a pre-pressurization stage of said tank so as to guarantee in the containers said first pressure (P1) during the starting step of a blowing cycle.

5. A method according to claim 4, wherein said pre-pressurization stage includes a reduction of the pressure in excess (ps2) at a pressure (ps3) substantially lower with respect to the first pressure (P1), by means of a discharge valve controlled by a pressure transducer, and a possible correction up to value of said first pressure (P1) by means of a pressure adjuster, placed at the inlet of the in-line feeding of the tank.

6. A method according to claim 5, wherein there is provided an interruption of the in-line feeding of the tank by means of the pressure adjuster, at the starting time (t0) of a blowing cycle, by means of the actuation of an on/off valve.

7. A method according to claim 1, wherein the air recycled by the first recycling means is recycled in a recycling tank, different from the primary air tank, to provide primary air in a stage a) of a subsequent blowing cycle.

8. A method according to claim 1, wherein the air recycled in stage c) is recycled in either a first recycling tank or directly in the secondary air tank to supply a part of secondary air in blowing stage b) until a pressure (P5) is reached in the containers which is higher than the first pressure (P1) and lower than the second pressure (P2).

9. A method according to claim 8, wherein between stage c) and stage d) there are provided an intermediate discharge of the air from the cavities up to reach in the containers a pressure (P3') with a value between said first pressure (P1) and third pressure (P3), and a recycling of the air at said fifth pressure by means of second recycling means comprising a second recycling tank.

10. A method according to claim 9, wherein the air recycled during said intermediate discharge is used to supply primary air in a stage a) of a subsequent blowing cycle.

11. A method according to claim 9, wherein there is provided a pre-pressurization stage of the first and second recycling tanks so as to guarantee in the cavities said pressure (P5) for a first part of the stage b) and said first pressure (P1) during a starting step of a blowing cycle, respectively.

12. A method according to claim 9, wherein during stage d) when a pressure (P4) is reached, there is provided the maintaining of the air in the cavity at said pressure (P4) for implementing a step of recirculating in the cavities up to a third time (t4').

13. A method according to claim 9, wherein during said intermediate discharge when a pressure (P4') is reached, there is provided the maintaining of the air in the cavity at said pressure (P4') for implementing a step of recirculating in the cavities up to a third time (t4').

14. A method according to claim 9, wherein the third pressure (P3) has a value between 25 and 28 bar, said second predetermined pressure (P2) has a value equal to approximately 40 bar and said first predetermined pressure (P1) has a value equal to approximately 10 bar.

15. A method according to claim 14, wherein the third pressure (P3) has a value between 22 and 25 bar.

16. A blow moulding apparatus for blow moulding plastic material containers, adapted to carry out the method according to claim 1, comprising:

moulds provided with blowing cavities, first blowing means for blowing primary air in the cavities of said moulds, comprising a primary air tank, second blowing means for blowing secondary air in the cavities of said moulds, comprising a secondary air tank, first recycling means for recycling the blowing air exiting from said cavities, in a first step of discharging the air from the containers, wherein said first recycling means are configured so as either to allow an input of primary air into a first blowing stage within the cavities of said moulds or to allow an input of a part of secondary air into a second blowing stage.

17. An apparatus according to claim 16, wherein said first recycling means comprise the primary air tank and a valve for inputting primary air into said cavities, said valve being of the two-way type and adapted to allow a direct recycling of the blowing air in said primary air tank.

18. An apparatus according to claim 17, wherein there are provided pre-pressurization means of the primary air tank comprising a discharge valve controlled by a pressure transducer and a pressure adjuster placed at the inlet of the in-line feeding of the primary air tank.

19. An apparatus according to claim 18, wherein there is provided an on/off valve adapted to interrupt the in-line feeding of the primary air tank, by means of the pressure adjuster, when the primary air blowing into the cavities starts.

20. An apparatus according to claim 16, wherein said first recycling means comprise a recycling tank, different from the primary air tank, to supply primary air into said cavities.

21. An apparatus according to claim 16, wherein said first recycling means comprise a first recycling tank, a recycling valve and the corresponding recycling piping and are adapted to allow an input of part of the secondary air in the blowing stage b) within the containers so as to generate said fourth pressure (P5) in the cavities themselves.

22. An apparatus according to claim 16, wherein said first recycling means comprise the secondary air tank and a valve for inputting secondary air into said cavities, said valve being of the two-way type and adapted to allow a direct recycling of the blowing air in said secondary air tank.

23. An apparatus according to claim 21, wherein there are provided second storing means for storing the air exiting from said cavities, in a second air discharge step, which are adapted to allow an input of primary air in the blowing stage a) within the containers so as to generate said first pressure (P1) in the cavities themselves.

24. An apparatus according to claim 23, wherein said second storing means comprise a second recycling tank, a recycling valve and a corresponding recycling piping.

25. An apparatus according to claim 16, wherein there are provided input means for inputting recycling air in said containers, placed in the cavities of said moulds, comprising a recirculating valve and a corresponding recirculating piping.

* * * * *